United States Patent
Tsai et al.

(10) Patent No.: US 10,270,884 B2
(45) Date of Patent: Apr. 23, 2019

(54) CONTROL METHOD, NETWORK SYSTEM AND CONTROL PLATFORM FOR MOBILE-EDGE COMPUTING

(71) Applicants: WISTRON NEWEB CORPORATION, Hsinchu (TW); INDUSTRIAL TECHNOLOGY RESEARCH INSTITUTE, Hsinchu (TW)

(72) Inventors: I-Hsing Tsai, Hsinchu (TW); Yen-Chang Chiu, Hsinchu (TW); Chuan-Yuan Huang, Hsinchu (TW); Ting-Chen Song, Hsinchu (TW); Szu-Hsien Huang, Hsinchu (TW); Chih-Wei Chung, Hsinchu (TW); Feng-Zhong Hsu, Hsinchu (TW)

(73) Assignees: WISTRON NEWEB CORPORATION, Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1 day.

(21) Appl. No.: 15/611,996

(22) Filed: Jun. 2, 2017

(65) Prior Publication Data

US 2018/0352051 A1 Dec. 6, 2018

(51) Int. Cl.
*H04L 29/08* (2006.01)
*H04W 8/00* (2009.01)
*H04W 88/04* (2009.01)
*H04W 88/16* (2009.01)
*H04W 4/02* (2018.01)

(52) U.S. Cl.
CPC .............. *H04L 67/32* (2013.01); *H04L 67/10* (2013.01); *H04W 8/005* (2013.01); *H04W 4/023* (2013.01); *H04W 88/04* (2013.01); *H04W 88/16* (2013.01)

(58) Field of Classification Search
CPC ..................................................... H04L 67/32
See application file for complete search history.

(56) References Cited

U.S. PATENT DOCUMENTS

| 8,989,000 B2 | 3/2015 | Draznin et al. | |
| 2013/0100815 A1* | 4/2013 | Kakadia | H04W 40/00 370/237 |
| 2013/0188515 A1* | 7/2013 | Pinheiro | H04L 67/16 370/254 |

(Continued)

FOREIGN PATENT DOCUMENTS

| CN | 105657643 A | 6/2016 |
| CN | 106211188 A | 12/2016 |

(Continued)

*Primary Examiner* — Nicholas R Taylor
*Assistant Examiner* — Sanjoy Roy
(74) *Attorney, Agent, or Firm* — Li & Cai Intellectual Property (USA) Office

(57) ABSTRACT

A control method, a network system and a control platform for mobile-edge computing (MEC) are provided. The control method can select at least one of relay gateways in the device-to-device relay network as a mobile-edge cloudlet for a user equipment. An application service program may be performed by the mobile-edge cloudlet, that the user equipment may receive a corresponding response with respect to an application service without accessing to a core network.

14 Claims, 8 Drawing Sheets

(56) References Cited

U.S. PATENT DOCUMENTS

| | | | |
|---|---|---|---|
| 2015/0237128 A1 | 8/2015 | Castro et al. | |
| 2015/0256349 A1* | 9/2015 | Kim | H04L 12/1407 370/259 |
| 2016/0100330 A1* | 4/2016 | Broustis | G06F 9/45558 370/237 |
| 2016/0366244 A1* | 12/2016 | Chiu | H04L 67/32 |
| 2017/0034643 A1* | 2/2017 | Young | H04W 4/70 |

FOREIGN PATENT DOCUMENTS

| | | |
|---|---|---|
| EP | 3297326 A1 | 3/2018 |
| TW | I538550 B | 6/2016 |
| TW | 201644230 A | 12/2016 |

\* cited by examiner

CONTROL METHOD, NETWORK SYSTEM AND CONTROL PLATFORM FOR MOBILE-EDGE COMPUTING

BACKGROUND OF THE INVENTION

1. Field of the Invention

The present disclosure relates to a control method, network system and control platform for mobile-edge computing (MEC); more particularly, to an MEC control method, network system and control platform adopted for device-to-device (D2D) relay network.

2. Description of Related Art

With the prevalence of mobile communication technology, access to the Internet is a common function on user equipment (UE) nowadays, which allows users to access multiple applications available on the Internet, such as applications for image analysis or on-line coupons. However, either for traditional centralized or cloud server structure, the processing ability of a core network (CN) and a cloud server can be increased only by constantly increasing the hardware equipment to meet growing user demands. The European Telecommunications Standards Institute (ETSI) thus proposes a new configuration for internet service concept, which is the so-called mobile-edge computing (MEC).

In MEC, since the electronic devices that are close to the UE (e.g., smart phone, smart television or smart wearable device) are configured to perform the applications, users do not need CNs to connect to the Internet while corresponding responses from the applications can still be obtained, allowing for a low latency on the services, and also greatly relieving the loading pressure for the CN. However, MEC for D2D relay network is still an issue that requires further development.

SUMMARY OF THE INVENTION

From what is addressed above, a control method, network system and control platform for mobile-edge computing (MEC), and more particularly, an MEC control method, network system and control platform adopted for device-to-device (D2D) relay network is provided in the present disclosure.

In one embodiment of the present disclosure, a control method for mobile-edge computing (MEC), being operated in a network system, in which the network system includes a device-to-device (D2D) relay network, at least one user equipment (UE) and a control platform. The control method includes the following steps. Firstly, instructing the control platform to receive a request message from the UE, in which the request message is used to request an execution of an application service program. Next, according to the request message of the UE, the control platform selects at least one of relay gateways in the D2D relay network as a mobile-edge cloudlet for the UE, and performs the application service program through the mobile-edge cloudlet.

In another embodiment, a network system for mobile-edge computing (MEC) is provided. The network system includes a device-to-device (D2D) relay network, at least one user equipment (UE) and a control platform. The control platform receives a request message from the UE, in which the request message is used to request an execution of an application service program. The control platform, according to the request message of the UE, selects at least one of relay gateways in the D2D relay network as a mobile-edge cloudlet for the UE, and performs the application service program through the mobile-edge cloudlet.

In yet another embodiment, a control platform for mobile-edge computing (MEC) is provided. The control platform includes a processor and a storage circuit configured to store a message processing module and an MEC managing module. The message processing module is configured to instruct the processor to receive a request message from a user equipment (UE), and the MEC managing module is configured to instruct the processor to, according to the request message of the UE, select at least one of relay gateways in a device-to-device (D2D) relay network as a mobile-edge cloudlet for the UE, and to perform the application service program through the mobile-edge cloudlet.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
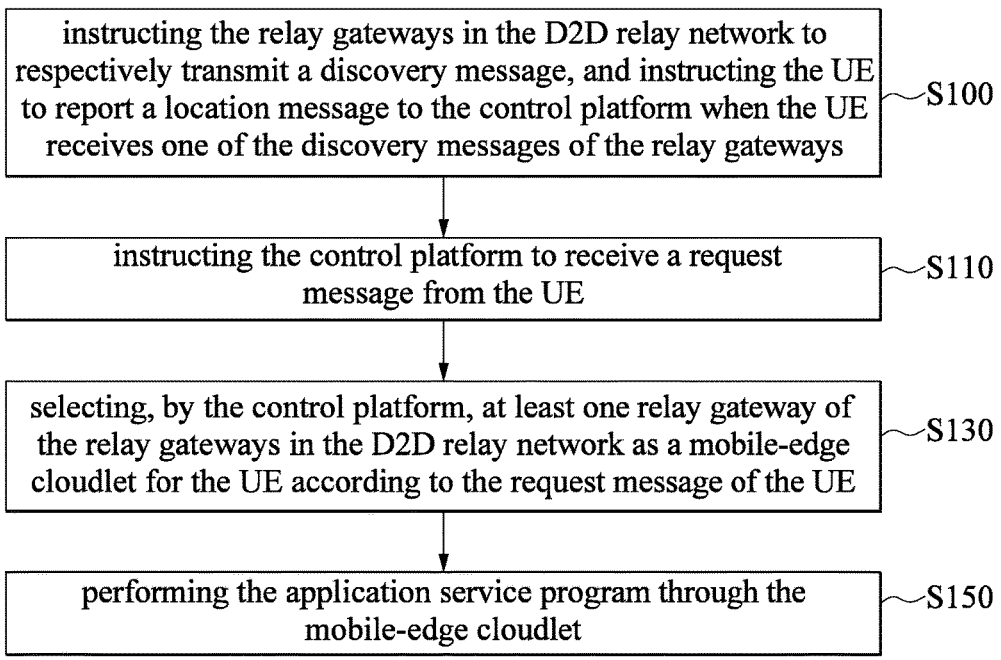
FIG. 1 is a flowchart of the control method for mobile-edge computing (MEC) according to an embodiment of the present disclosure.
Figure 2:
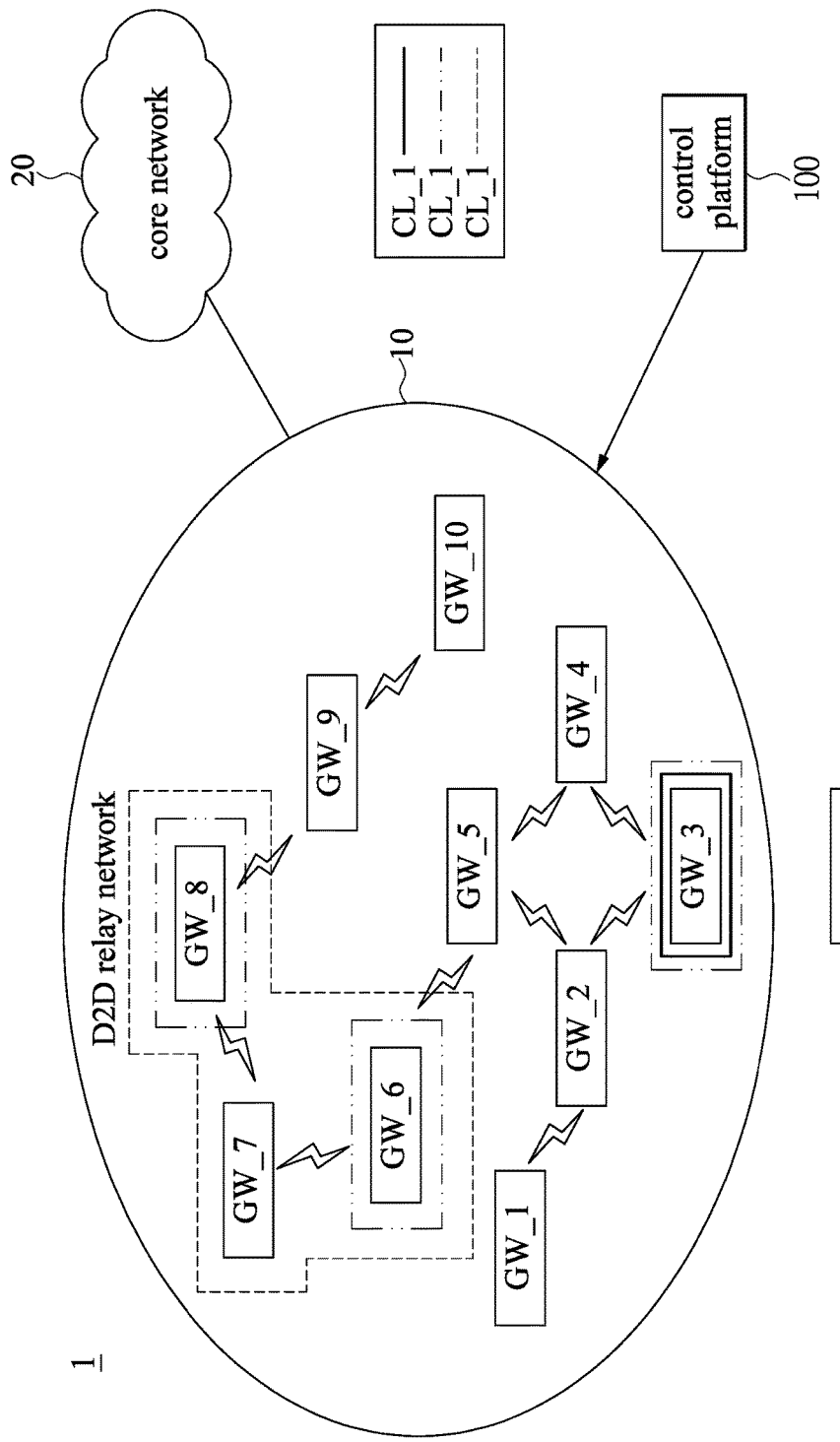
FIG. 2 is a schematic view illustrating the network system according to an embodiment of the present disclosure.

References are first made to FIGS. 1 and 2, where FIG. 1 is a flowchart of the control method for mobile-edge computing (MEC) according to an embodiment of the present disclosure and FIG. 2 is a schematic view illustrating the network system according to an embodiment of the present disclosure. The control method for MEC as shown in FIG. 1 can be, but not limited to, applied in the network system 1 in FIG. 2.

As shown in FIG. 2, the network system 1 includes a D2D relay network 10, at least one UE_1~UE_N (N is an integer greater or equal to 1) and a control platform. Noteworthily, for the sake of brevity, the following description uses 1 for the number of the UE_1~UE_N; however, the present disclosure is not limited thereto.

The D2D relay network 10, can be, for example, composed of a plurality of relay gateways GW_1~GW_M (M is an integer greater or equal to 2). For the sake of brevity, the following description uses 10 for the number of the relay gateways GW_1-GW_M as an example; however, the present disclosure is not limited thereto. Since the principle of the D2D relay network 10 is well known to people with ordinary skill in the art, the relevant descriptions are omitted herein for the sake of brevity.

In the D2D relay network 10, data transmission can be performed through each of the relay gateways GW_1~GW_M one by one, which implies that UE_1 only needs to connect to any one of the relay gateways GW_1~GW_M through wireless network, and that UE_1 would be able to access the internet resources thereby. It should be noted that the distribution location, internet topology type and direction of data transmission of each of the relay gateways GW_1~GW_M are not limited to only the configuration shown in FIG. 2.

The control platform 100 includes proper logic, circuit and/or codes, and the control platform 100 can, through wire or wireless communication, communicates and shares with each of the relay gateways GW_1~GW_M. That is, in one of the applications, the control platform 100 may be installed on one relay gateway among these relay gateways GW_1~GW_M.

In other applications, the control platform 100 may be installed on an electronic device (not shown in the figure) other than the relay gateways in the D2D relay network 10. Generally speaking, the present disclosure does not limit the practical implementation of the control platform 100, thus one with ordinary skill in the art can design accordingly to meet different practical demands.

When the UE_1 would like to obtain a certain application service, the control platform 100 would receive a request message (not shown in the figure) from the UE_1. The request message is used to request an execution of an application service program. Next, the control platform 100, according to the request message of the UE_1, selects at least one relay gateway GW_i of the relay gateways GW_1~GW_M in the D2D relay network 10 as a mobile-edge cloudlet CL_1 for the UE_1, and performs the application service program through the mobile-edge cloudlet CL_1.

It should be noted that, since the control platform 100 can select at least one from the relay gateways GW_1~GW_M as the mobile-edge cloudlet CL_1 for the UE_1 in many ways, different ways of the selection would be, as shown in FIG. 2, represented in different lines (e.g., thick solid frame lines, dotted frame lines and chain frame lines), and would be described in detail in different embodiments.

According to above descriptions, one with ordinary skill in the art can understand that, since the mobile-edge cloudlet CL_1 is between the UE_1 and a core network (CN) 20, the control method and network system 1 for MEC according to the embodiments of the present disclosure would obtain the corresponding responses from the applications without the need of the core network 20 when the mobile-edge cloudlet CL_1 is used to perform the relevant applications.

For the MEC control method performed by the network system 1 as shown in FIG. 2, reference is again made to FIG. 1. In step S110, instructing the control platform 100 to receive a request message from the UE_1, in which the request message is used to request an execution of an application service program.

Next, in step S130, according to the request message of the UE_1, the control platform 100 selects at least one relay gateway GW_i of the relay gateways GW_1~GW_10 in the D2D relay network 10 as a mobile-edge cloudlet CL_1 for the UE_1. Finally, in step S150, the application service program is performed through the mobile-edge cloudlet CL_1.

It should be noted that, the UE_1 should be equipped with mobility, and the control platform 100 has to confirm beforehand that the UE_1 has been added into the D2D relay network 10, then selects at least one of the relay gateways GW_1~GW_10 in the D2D relay network 10 as a mobile-edge cloudlet CL_1 for the UE_1. That is to say, step S100 can be performed before step S110 is performed, as shown in FIG. 1.

In step S100, instructing the relay gateways GW_1~GW_10 in the D2D relay network 10 to respectively transmit a discovery message (not shown in the figure), and instructing the UE_1 to report a location message (not shown in the figure) to the control platform 100 when the UE_1 receives one of the discovery messages of the relay gateways GW_1~GW_10, so as allowing the control platform 100 to confirm that the UE_1 has been added into the D2D relay network 10. It should be noted that the implementation of how the relay gateways GW_1~GW_10 transmit the discovery message is not limited in the present disclosure. The location message can be the physical location of the UE_1, for example, a distance between UE_1 and each of relay gateways GW_1~GW_10.

In one of the applications, the location message reported by the UE_1 may be firstly transmitted to the relay gateway which transmits the discovery message (e.g., relay gateway GW_3), and then be transmitted to the control platform 100 through that relay gateway. In another one of the applications, when the UE_1 receives multiple discovery messages from the relay gateways, the location message reported by the UE_1 would be transmitted to the relay gateway which transmits the discovery message with the strongest signal intensity, and then be transmitted to the control platform 100 by this relay gateway.

Generally speaking, the present disclosure does not limit the implementation on how the UE_1 transmits the location message to the control platform 100; therefore, people with ordinary skill in the art can design correspondingly to meet practical demands or applications and can understand that one of the purposes of step S100 is to position the UE_1, and the relevant descriptions are omitted herein for the sake of brevity since the positioning is well known in the art.

Figure 3A:
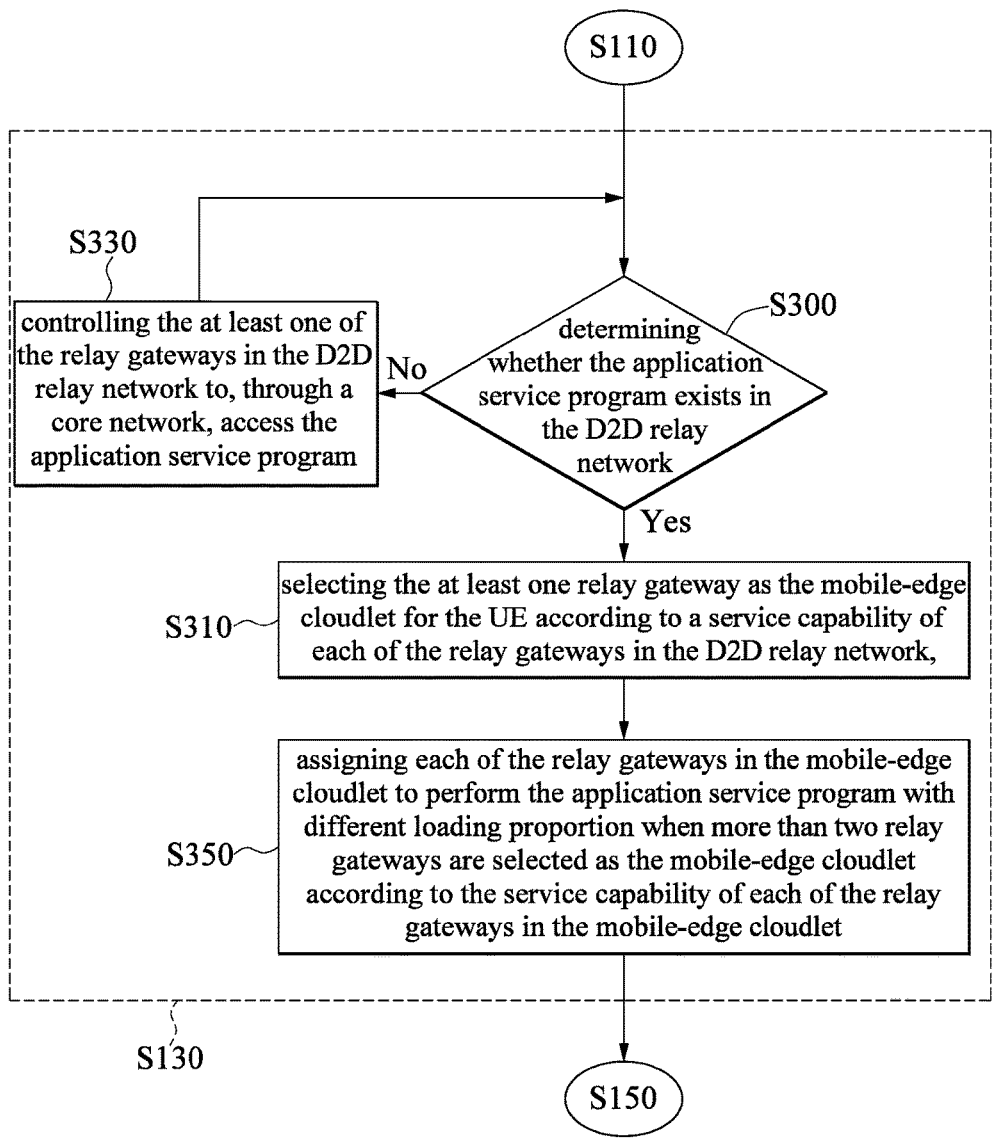
FIG. 3A is a flowchart illustrating the step of selecting at least one of relay gateways in the D2D relay network as a mobile-edge cloudlet for the UE according to an embodiment of the present disclosure.

How the control platform 100, as shown in FIG. 2, selects at least one relay gateway of the relay gateways GW_1~GW_10 as a mobile-edge cloudlet CL_1 for the UE_1 will be further discussed in the following. That is to say, one of the implementations for step S130 is provided in the present disclosure. Referring to FIG. 3A collectively, FIG. 3A is a flowchart illustrating the step of selecting at least one of relay gateways in the D2D relay network as a mobile-edge cloudlet for the UE_1 according to an embodiment of the present disclosure.

In step S300, the control platform 100 determines whether the requested application service program of the UE_1 exists in the D2D relay network 10. When the application service program is determined being in the D2D relay network 10, step S310 would be performed. In step S310, the control platform 100, according to a service capability (not shown in the figure) of each of the relay gateways GW_1~GW_10 in the D2D relay network, selects the at least one relay gateway GW_i as the mobile-edge cloudlet CL_1 for the UE_1.

Similarly, when the application service program is determined as not existing in the D2D relay network 10, step S330 would be performed. In step S330, the control platform 100 controls the at least one of the relay gateways GW_1~GW_10 in the D2D relay network 10 to, through a core network (CN), access the application service program and re-perform step S300.

Noteworthily, the implementation of service capability is not limited in the present disclosure. In one embodiment, the "service capability of each of the relay gateways GW_1~GW_10" may be, but not limited to, a CPU remaining usage rate of each of the relay gateways GW_1~GW_10, a bandwidth remaining usage rate of each of the relay gateways GW_1~GW_10, a node distance value between the UE_1 and each of the relay gateways GW_1~GW_10 or the combination of above. An example is shown in the following Table 1

TABLE 1

| Relay gateway | CPU remaining usage rate (%) | Bandwidth remaining usage rate (%) | Node distance value from the UE_1 |
|---|---|---|---|
| GW_1 | 10 | 40 | −2 |
| GW_2 | 34 | 66 | −1 |
| GW_3 | 43 | 80 | 0 |
| GW_4 | 9 | 54 | −1 |
| GW_5 | 11 | 43 | −2 |
| GW_6 | 76 | 36 | −3 |
| GW_7 | 62 | 29 | −4 |
| GW_8 | 67 | 25 | −5 |
| GW_9 | 39 | 20 | −6 |
| GW_10 | 20 | 16 | −7 |

Assuming that "the service capability of each of the relay gateways GW_1~GW_10 only means the bandwidth remaining usage rate of each of the relay gateways GW_1~GW_10, when the application service program is determined being in the D2D relay network 10, the control platform 100, according to the bandwidth remaining usage rate of each of the relay gateways GW_1~GW_10, selects the at least one relay gateway GW_i as the mobile-edge cloudlet CL_1 for the UE_1.

For example, in one of the applications, the control platform 100 can select the relay gateway GW_3 with a bandwidth remaining usage rate higher than a first threshold (e.g., 70%) as the mobile-edge cloudlet CL_1 for the UW_1, as shown by the solid frame lines in FIG. 2.

In another application, assuming that "the service capability of each of the relay gateways GW_1~GW_10 only means the CPU remaining usage rate of each of the relay gateways GW_1~GW_10, when the application service program is determined as being in the D2D relay network 10, the control platform 100, according to the CPU remaining usage rate as shown in Table 1, selects the at least one relay gateway GW_i as the mobile-edge cloudlet CL_1 for the UE_1.

For example, in one of the applications, the control platform 100 can select the relay gateways GW_6, GW_7 and GW_8, each with a CPU remaining use rate higher than a second threshold (e.g., 60%) as the mobile-edge cloudlet CL_1 for the UE_1, as shown by the dotted frame lines in FIG. 2. In sum, the implementation of how a relay gateway is selected as the mobile-edge cloudlet CL_1 is not limited in the present disclosure.

Moreover, when more than two relay gateways are selected as the mobile-edge cloudlet CL_1, the embodiment as shown in FIG. 3A would then move to step S350. In step S350, the control platform 100, according to the service capability of each of the relay gateways in the mobile-edge cloudlet CL_1, assigns each of the relay gateways in the mobile-edge cloudlet CL_1 to perform the application service program with different loading proportions.

For example, assuming that "the service capability of each of the relay gateways GW_1~GW_10 only means the CPU remaining usage rate of each of the relay gateways GW_1~GW_10, and the relay gateways GW_6, GW_7 and GW_8 have been selected by the control platform 100 to be the mobile-edge cloudlet CL_1 for the UE_1, the control platform 100 would, according to the remaining CPU usage rate of these relay gateways GW_6, GW_7 and GW_8, assign each of the relay gateways GW_6, GW_7 and GW_8 to perform the application service program with different loading proportions.

In one of the applications, the relay gateway GW_6 can be assigned to perform 37% of the application (e.g., 37%≅[76/(76+62+67)]*100%), the relay gateway GW_7 can be assigned to perform 32% of the application (e.g., 30%≅[62/(76+62+67)]*100%) and the relay gateway GW_8 can be assigned to perform 28% of the application (e.g., 33%≅[67/(76+62+67)]*100%).

According to above, the loading among the relay gateways GW_6, GW_7 and GW_8 are balanced, so as to decrease the time for performing the application. In sum, the descriptions as addressed above are only for example, and thus should not limit the scope of the present disclosure.

The implementation of the service capability (as listed in Table 1) of each of the relay gateways GW_1~GW_10 obtained by the control platform 100 is not limited in the present disclosure; therefore, one with ordinary skill in the art can have different designs to meet different demands. It should be noted that, since in the D2D relay network 10, data transmission is performed through each of the relay gateways GW_1~GW_10 one by one, the node distance value of each of the relay gateways GW_1~GW_10 in Table 1 are implied to be represented as a decrement value rather than regular distance value.

For example, as shown in FIG. 2, since the relay gateway GW_3 is the closest to the UE_1, the relay gateway GW_3 can directly transmit data with the UE_1 without other relay gateways involved. Therefore, the node distance value between the relay gateway GW_3 and the UE_1 can be represented by "0".

Similarly, since the relay gateway GW_2 (or relay gateway GW_4) can only transmit data with the UE_1 through the relay gateway GW_3, the node distance value between the relay gateway GW_2 and the UE_1 can be represented by "−1," so on and so forth. Therefore, the node distance value between the relay gateway GW_10 and the UE_1 would be represented by "−7." It should be noted that the node distance value as addressed is for explanatory purposes only, and should not limit the scope of the present disclosure.

Figure 3B:
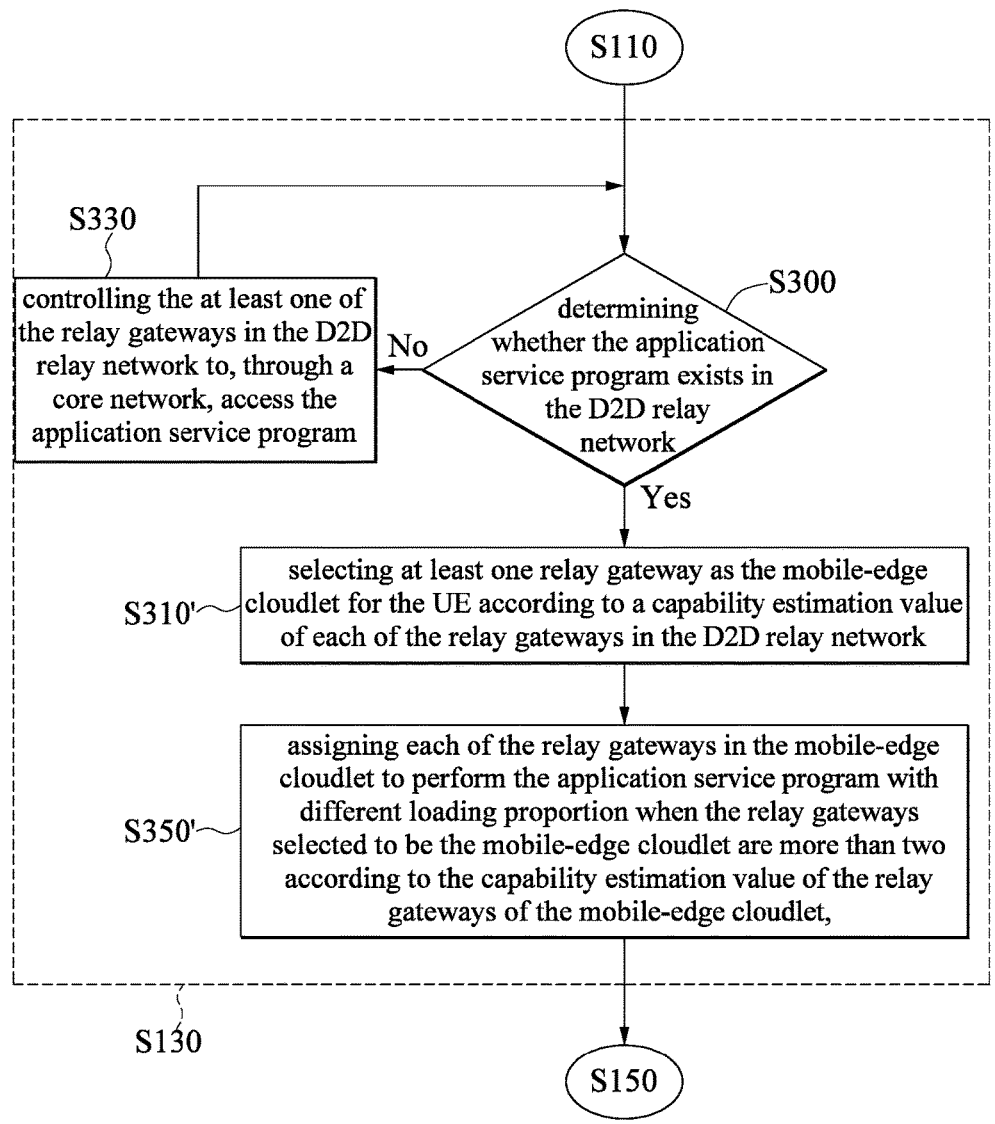
FIG. 3B is a flowchart illustrating the step of selecting at least one of relay gateways in the D2D relay network as a mobile-edge cloudlet for the UE according to another embodiment of the present disclosure.

In considering that the "service capability of each of the relay gateways GW_1~GW_10 can also be the weight combination of the parameters as listed in Table 1, reference would then be made together with FIG. 3B, which is a flowchart illustrating the step of selecting at least one of the relay gateways in the D2D relay network as a mobile-edge cloudlet for the UE_1 according to another embodiment of the present disclosure. The same steps in FIG. 3B as in FIG. 3A would be labeled with the same element number for the sake of brevity.

In the embodiment of FIG. 3B, when the control platform 100 determines that the application service program exists in the D2D relay network 10, step S310' would then be performed. In step S310', the control platform 100, according to a capability estimation value (not shown in the figure) of each of the relay gateways GW_1~GW_10 in the D2D relay network 10, selects at least one relay gateway GW_i as the mobile-edge cloudlet CL_1 for the UE_1.

Specifically, the control platform 100 may, according to at least two of the CPU remaining usage rate, the bandwidth remaining usage rate and the node distance value of each of the relay gateway GW_1~GW_10, establish a weight equation. The weight equation would thus be used to calculate a capability estimation value of each of the relay gateways GW_1~GW_10 in the D2D relay network 10. For example, the weight equation can be expressed as follows:

$$A*Wa+B*Wb+C*Wc=W \qquad \text{(equation 1)}$$

In equation 1, W is the capability estimation value of each of the relay gateways GW_1~GW_10 in the D2D relay network 10, A is the CPU remaining usage rate of each of the relay gateways GW_1~GW_10, B is the bandwidth remaining usage rate of each of the relay gateways GW_1~GW_10 and C is the node distance value between the UE_1 and each of the relay gateways GW_1~GW_10. Further, Wa, Wb and Wc respectively are a CPU remaining usage rate weight, a bandwidth remaining usage rate weight and a node distance value weight.

It should be noted that the implementation of the weight equation as addressed above is only for explaining, and thus should not limit the scope of the present disclosure. Since the control platform 100 establishes the weight equation according to at least two of the CPU remaining usage rate, the bandwidth remaining usage rate and the node distance value between UE_1 and each of the relay gateways GW_1~GW_10, the weight equation can also be expressed as, but not limited to, A*Wa+B*Wb=W, A*Wa+C*Wc=W or B*Wb+C*Wc=W.

In one embodiment, assuming that Wa, Wb and Wc respectively are 2, 1 and 1, the control platform 100 would thus, through the weight equation, calculate the capability estimation value of each of the relay gateways GW_1~GW_10, as listed in the following table 2.

TABLE 2

| Relay gateway | Capability estimation value |
|---|---|
| GW_1 | 58 |
| GW_2 | 133 |
| GW_3 | 166 |
| GW_4 | 71 |
| GW_5 | 63 |
| GW_6 | 158 |
| GW_7 | 149 |
| GW_8 | 154 |
| GW_9 | 92 |
| GW_10 | 49 |

It should be noted that, the above-mentioned weights Wa, Wb and Wc are only for explanation, and thus should not limit the present disclosure. In one of the applications, the control platform 100 can select the relay gateways GW_3, GW_6 and GW_8 each with a capability estimation value higher than a third threshold (e.g., 150) as the mobile-edge cloudlet CL_1 for the UE_1, as shown by the chain frame lines in FIG. 2.

In other words, in step S310', for each of the relay gateways GW_1~GW_10 in the D2D relay network, the control platform 100 would determine whether the capability estimation value of the relay gateway GW_k (i.e., k is an integer ranging between 1 to 10) is greater than or equal to a capability threshold (i.e., the third threshold), and when the capability estimation value of the relay gateway GW_k is determined to be greater than or equal to the capability threshold, the control platform 100 would select the relay gateway GW_k as the relay gateway in the mobile-edge cloudlet CL_1.

In sum, the implementation of selecting a relay gateway to be the mobile-edge cloudlet CL_1 as addressed is only for exemplary purposes, and thus should not limit the scope of the present disclosure. Likewise, it should be understood that when the relay gateways selected to be the mobile-edge cloudlet CL_1 are more than two (e.g., the relay gateways GW_3, GW_6 and GW_8 as shown in FIG. 2), the embodiment as shown in FIG. 3B moves to step S350', in which the control platform 100, according to the capability estimation value of the relay gateways GW_3, GW_6 and GW_8 of the mobile-edge cloudlet CL_1, assigns each of the relay gateways in the mobile-edge cloudlet CL_1 to perform the application service program with different loading proportions.

For example, the relay gateway GW_3 can be assigned to perform 35% of the application (e.g., 35%≅{[158/(166+158+154)]*100%}), relay gateway GW_6 can be assigned to perform 33% of the application (e.g., 33%≅{[158/(166+158+154)]*100%}) and the relay gateway GW_8 can be assigned to perform 32% of the application (e.g., 32%≅{[154/(166+158+154)]*100%}). In sum, the descriptions as addressed above are only for example, and thus should not limit the scope of the present disclosure.

Figure 4:
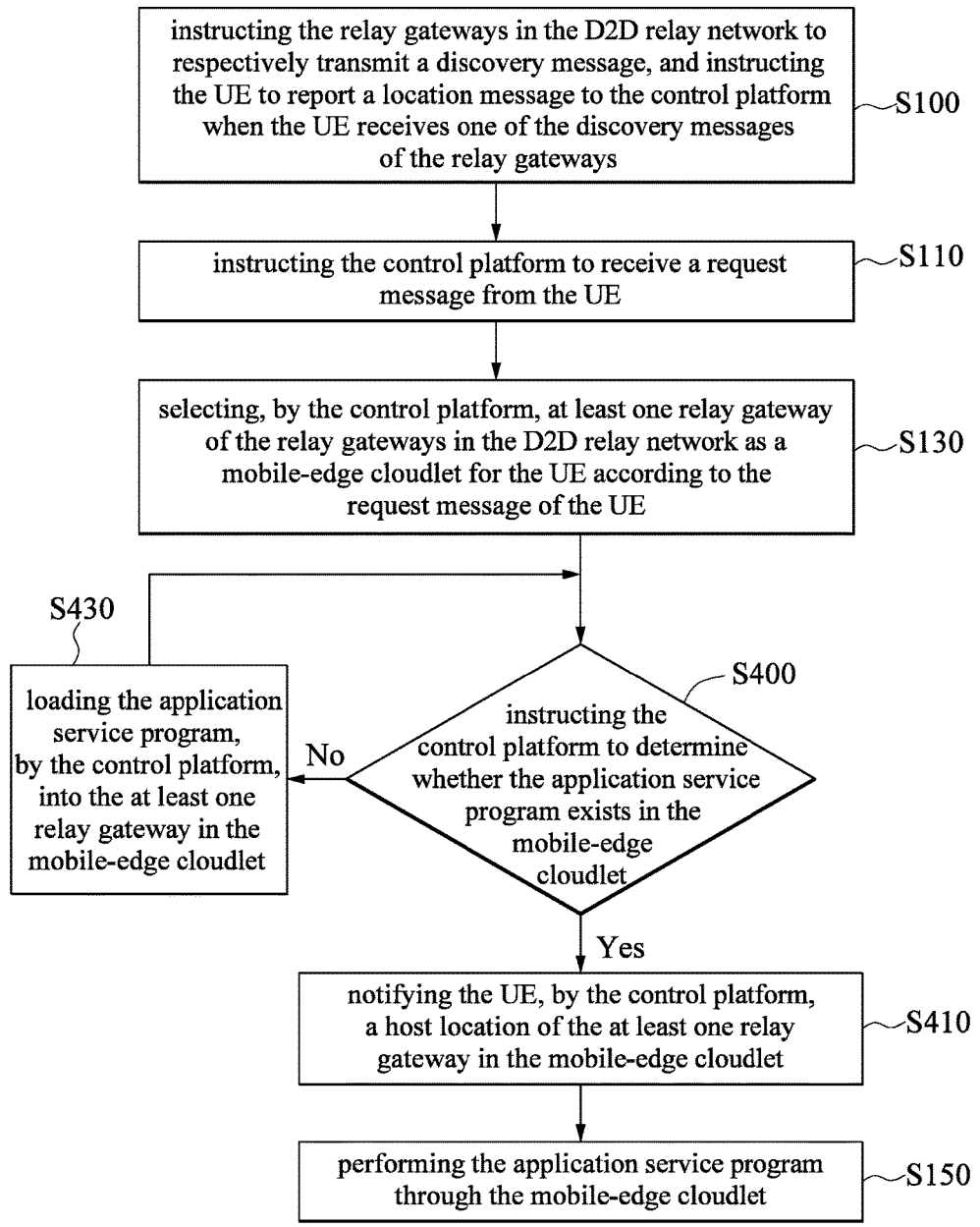
FIG. 4 is a flowchart of the control method for mobile-edge computing (MEC) according to another embodiment of the present disclosure.

To be more specific, in the embodiments shown in FIGS. 3A and 3B, the control platform 100 can select the suitable relay gateway to be the mobile-edge cloudlet CL_1 for the UE_1, however, the control platform 100 cannot ensure that the application service program the UE_1 requests to perform would be existed in the relay gateways of the mobile-edge cloudlet CL_1. Reference is thus made to FIG. 4, which is a flowchart of the control method for mobile-edge computing (MEC) according to another embodiment of the present disclosure. The control method as shown in FIG. 4 can also be implemented in the network system 1 of FIG. 2, and FIG. 2 is thus recommended for overall reference herein. Moreover, the same steps in FIG. 4 as in FIG. 1 would be labeled with the same element number for the sake of brevity.

In the embodiment as shown in FIG. 4, steps S400~S430 can further be performed before step S150 is performed. In step S400, instructing the control platform 100 to determine whether the application service program exists in the mobile-edge cloudlet CL_1, when the application service program is determined as being in the mobile-edge cloudlet CL_1, step S410 would then be performed. In step S410, the control platform 100 notifies the UE_1 with a host location of the at least one relay gateway in the mobile-edge cloudlet CL_1. The host location can be, but not limited to, MAC (media access control) address or IP (internet protocol) address. It can further be the physical location of the relay gateway in the mobile-edge cloudlet CL_1.

Similarly, when the application service program is determined not existing in the mobile-edge cloudlet CL_1, step S430 would then be performed. In step S430, the control platform 100 loads the application service program into the at least one relay gateway in the mobile-edge cloudlet CL_1 and return to step S400 to re-perform.

For example, assuming that the control platform 100 has already selected the relay gateways GW_3, GW_6 and GW_8 to be the mobile-edge cloudlet CL_1 for the UE_1, under such situation, when step S400 as shown in FIG. 4 is proceeded with, the control platform 100 would determine whether the application service program exists in the relay gateways GW_3, GW_6 and GW_8. If the application service program does not pre-exist in the relay gateways GW_3, GW_6 and GW_8, the control platform 100 would load the application service program into at least one of the relay gateways GW_3, GW_6 and GW_8, and then re-perform step S400.

It should be noted that, the implementation of how the control platform 100 loads the application service program into the relay gateways GW_3, GW_6 and GW_8 is not limited in the present disclosure. According to the above, people with ordinary skill in the art can understand that before step S400 is performed, the control platform 100 can already confirm that the application service program must exist in the D2D relay network 10 (i.e., as shown in step S300 of FIG. 3A or 3B).

That is to say, even if the application service program does not pre-exist in the relay gateways GW_3, GW_6 and GW_8, the application service program may still be existing in the relay gateways GW_1~GW_2, GW_4~GW_5, GW_7 and GW_9~GW_10. Therefore, in step S430, the control platform 100 can load the application service program into at least one of the relay gateways GW_3, GW_6 and GW_8 from relay gateways GW_1~GW_2, GW_4~GW_5, GW_7 and GW_9~GW_10 without accessing the core network 20.

Lastly, in step S410, the control platform 100 notifies the UE_1 with a host location of the at least one relay gateway GW_3, GW_6 and GW_8 in the mobile-edge cloudlet CL_1. By performance of this step, the UE_1 can know which relay gateway is in charge of communication. That is to say, the purpose of step S410 is, to establish a communication between the relay gateways GW_3, GW_6 and GW_8 and the UE_1. Since the establishment is well known, the related descriptions are omitted for the sake of brevity.

For example, as shown in FIG. 2, since the relay gateway GW_3 is the closest to the UE_1, in step S410, the control platform 100 would notify the UE_1 with the host location of the relay gateway GW_3. It should be noted that the above description is for explanatory purposes only, and should not limit the scope of the present disclosure.

Figure 5:
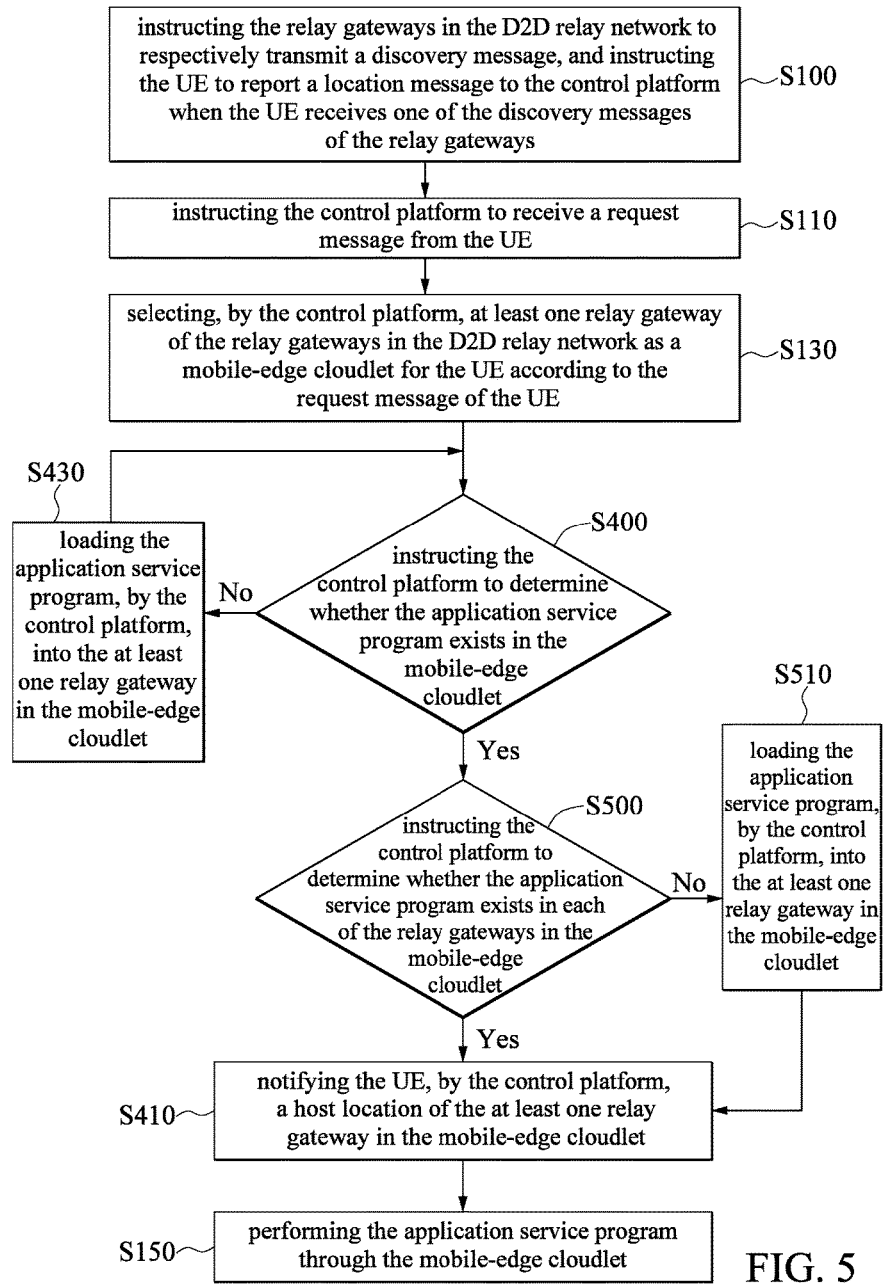
FIG. 5 is a flowchart of the control method for mobile-edge computing (MEC) according to one another embodiment of the present disclosure.

In considering that the control platform 100 can assign each of the relay gateways to perform the application service program with different loading proportions according to the service capability (or capability evaluation value) of each of the relay gateways in the mobile-edge cloudlet CL_1, reference is made to FIG. 5 collectively for the following descriptions, where FIG. 5 is a flowchart of the control method for mobile-edge computing (MEC) according to one another embodiment of the present disclosure. The control method as shown in FIG. 5 can also be implemented in the network system 1 of FIG. 2, and FIG. 2 is thus recommended for overall reference herein. Moreover, the same steps in FIG. 5 as in FIG. 4 would be labeled with the same element number for the sake of brevity.

In the embodiment as shown in FIG. 5, steps S500~S510 can be performed before step S410 is performed. In step S500, instructing the control platform 100 to determine whether the application service program exists in each of the relay gateways in the mobile-edge cloudlet CL_1, when the application service program is determined as being in each of the relay gateways in the mobile-edge cloudlet CL_1, the control method in FIG. 5 would thus move to step S410.

Similarly, when the application service program is determined as not existing in each of the relay gateways in the mobile-edge cloudlet CL_1, the control method in FIG. 5 would thus move to step S510. In step S510, the control platform 100 loads the application service program into each relay gateway in the mobile-edge cloudlet CL_1. The control method in FIG. 5 would perform step S510 before step S410. With the performance of steps S500 and S510, each relay gateway in the mobile-edge cloudlet CL_1 can be guaranteed to be assigned to perform the application service program with different loading proportions, so as to decrease the time for performing the application.

Figure 6A:
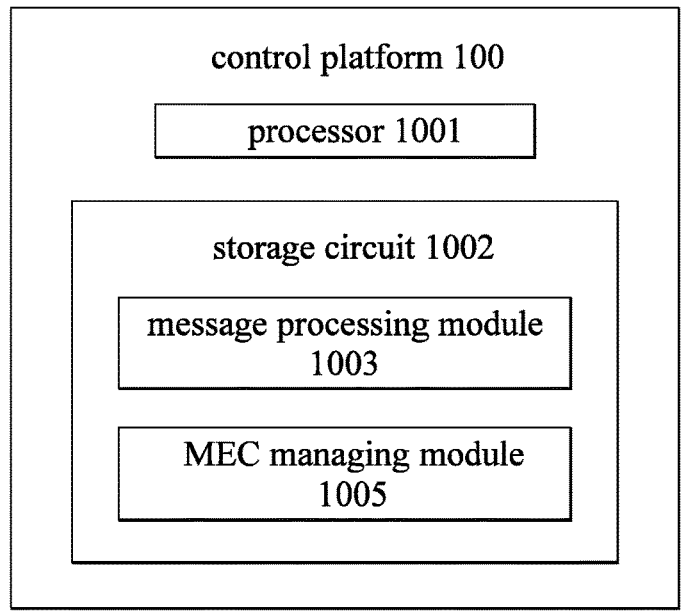
FIG. 6A is a schematic view illustrating the functional block of the control platform according to an embodiment of the present disclosure.

In order to further describe the control platform 100, an implementation for the control platform 100 is also provided in the present disclosure. Reference is next made to FIG. 6A, which is a schematic view illustrating the functional block of the control platform according to an embodiment of the present disclosure. It should be noted that the implementation for the control platform 100 that is about to be discussed is only an example, and thus should not be considered as limiting the scope of the present disclosure.

Specifically, the control platform 100 includes a processor 1001 and a storage circuit 1002. The storage circuit 1002 is configured to store a message processing module 1003 and an MEC managing module 1005. The message processing module 1003 and the MEC managing module 1005 can be, but not limited to, implemented by software, which is a code, or by the combination of hardware circuit and software. The above mentioned elements can be, but not limited to, installed integrally or separately.

In the present embodiment, the message processing module 1003 may include a proper programming code for instructing the processor 1001, so that the processor 1001 may receive a request message from at least one user equipment, and the request message is used to request an execution of an application service program. Moreover, the MEC managing module 1005 can also include a proper programming code for instructing the processor 1001, so that the processor 1001 may, according to the request message of the user equipment, select at least one of relay gateways in the D2D relay network as a mobile-edge cloudlet for the UE, and perform the application service program through the mobile-edge cloudlet.

To be more specific, the MEC managing module 1005 is configured to instruct the processor 1001, so as to allow the selection of at least one of relay gateways in the D2D relay network as a mobile-edge cloudlet for the UE during the process, the embodiments as shown in FIGS. 3A and 3B can be performed, and thus FIGS. 3A and 3B are recommended for overall reference herein. It should be noted that, the so-called "the service capability of each relay gateway" may be referred to as, but not limited to, a CPU remaining use rate of each of the relay gateways, a bandwidth remaining use rate of each of the relay gateways, a node distance value among the user equipment or any combination thereof.

Therefore, in considering that the so-called "the service capability of each relay gateway" means the weighting combination of the above parameters, the MEC managing module 1005 is configured to instruct the processor 1001, so as allowing the control platform 100, according to the CPU remaining usage rate, bandwidth remaining usage rate and the node distance value to establish a weight equation, and further through this weight equation, to calculate a capability estimation value of each of the relay gateways. After that, at least one of the relay gateways can be selected to be the mobile-edge cloudlet CL_1 for the UE_1, according to capability estimation value of each of the relay gateways in the D2D relay network 10.

Likewisely, it should be understood that when the relay gateways selected to be the mobile-edge cloudlet are more than two, the MEC managing module 1005 can further be configured to instruct the processor 1001, so as allowing the processor to assign each of the relay gateways in the mobile-edge cloudlet CL_1 to perform the application service program with different loading proportions according to the capability estimation value of each of the relay gateways of the mobile-edge cloudlet. The relative descriptions have been addressed as above and are omitted for the sake of brevity.

Figure 6B:
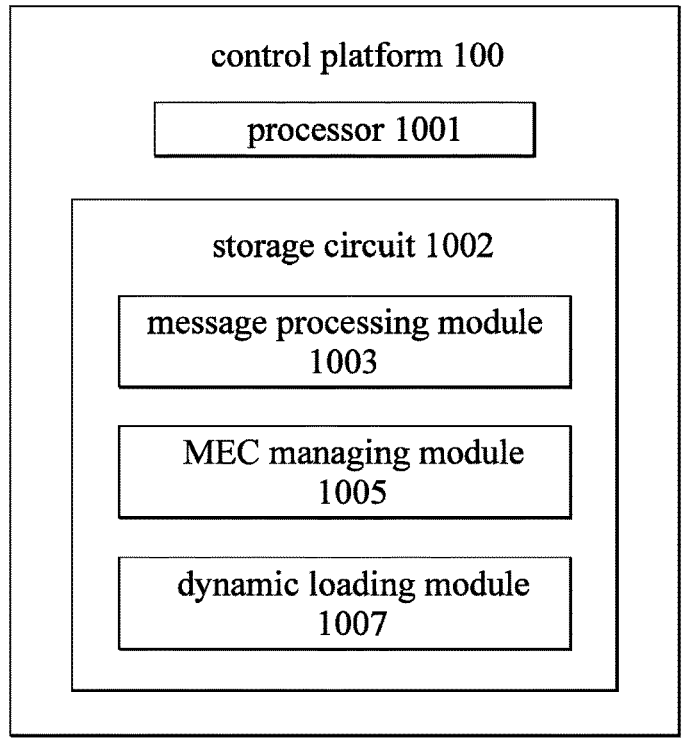
FIG. 6B is a schematic view illustrating the functional block of the control platform according to another embodiment of the present disclosure.

Reference is made to FIG. 6B, which is a schematic view illustrating the functional block of the control platform according to another embodiment of the present disclosure. Same elements in FIG. 6B as in FIG. 6A are labeled with the same element number, and relative descriptions are omitted for the sake of brevity.

As compared to the functional block in FIG. 6A, the storage circuit 1002 as shown in FIG. 6B is further stored with a dynamic loading module 1007. The dynamic loading module 1007 can also include a proper programming code, and when the application service program is determined as not existing in the mobile-edge cloudlet, the dynamic loading module 1007 would be configured to instruct the processor 1001 to load the application service program into the at least one relay gateway in the mobile-edge cloudlet.

It may also be that, when the application service program is further determined as not existing in each of the relay gateways in the mobile-edge cloudlet, the dynamic loading module 1007 would be configured to instruct the processor 1001 to load the application service program into the at least one relay gateway in the mobile-edge cloudlet. Next, the dynamic loading module 1007 would instruct the processor 1001, so as allowing the processor 1001 to notify the user equipment the host location of the at least one relay gateway in the mobile-edge cloudlet.

Figure 7:
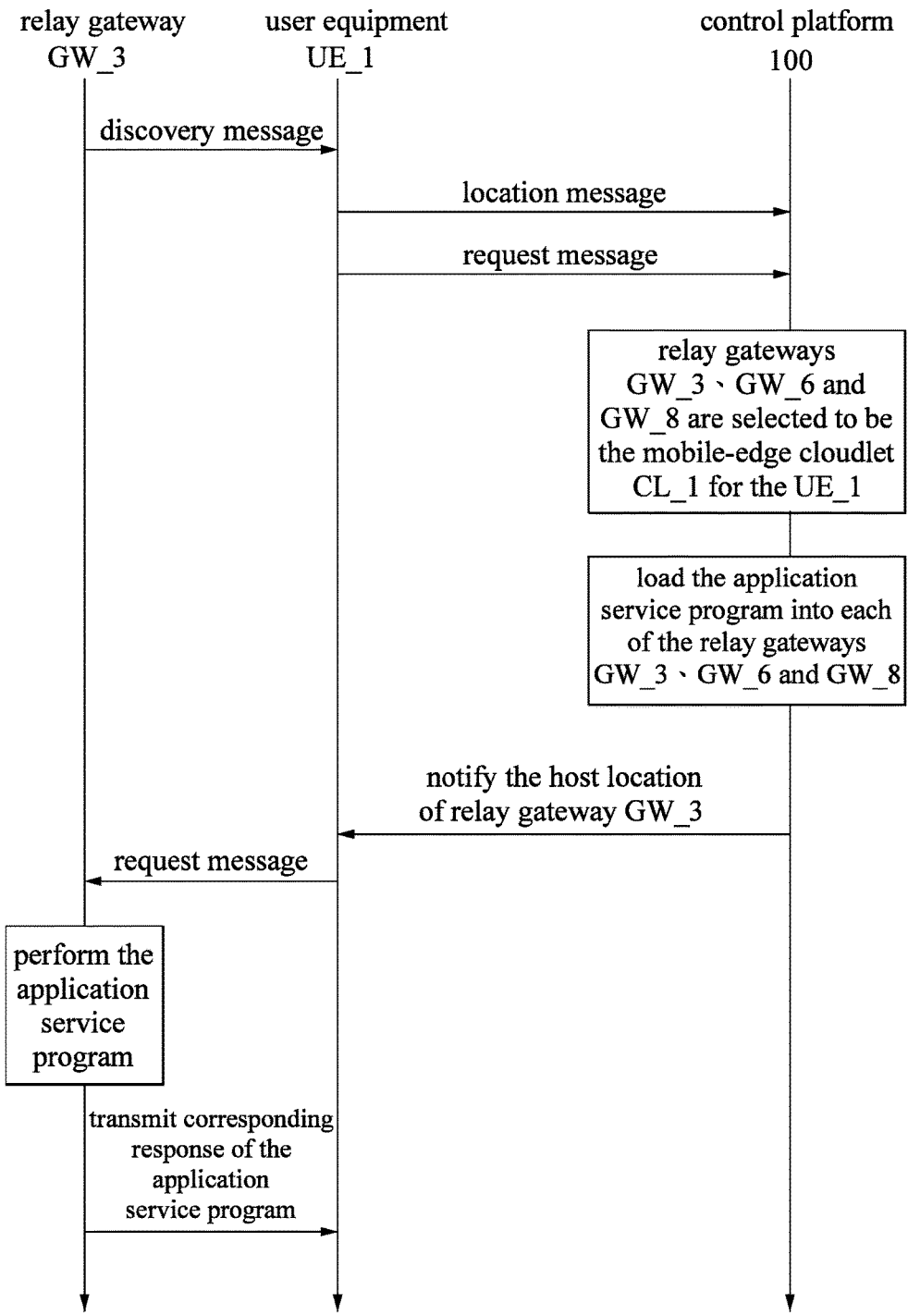
FIG. 7 is a signal sequence diagram illustrating the signal sequence of the control platform and UE as shown in FIG. 6B when under communication.

Moreover, the following explains by FIG. 7 how the control platform 100 as addressed above communicates with the user equipment. Reference is made to FIG. 7, which is a schematic view illustrating the signal sequence of the control platform and UE_1 as shown in FIG. 6B when under communication. It should be noted that, the embodiment as shown in FIG. 7 can also be implemented on the network system 1 in FIG. 2, and FIG. 2 is thus recommended for overall reference. Moreover, the same steps in FIG. 7 as in FIG. 2 would be labeled with the same element number for the sake of brevity.

As shown in the embodiment of FIG. 7, assuming that the UE_1 would report its location message to the control platform 100 when the UE_1 receives the discovery message from the relay gateway GW_3, the control platform 100 can make sure that the UE_1 has been added into the D2D relay network 10. Next, when the UE_1 would like to access to a certain application service, the UE_1 would send a request message to the control platform 100. After the control platform 100 receives the request message from the UE_1, the MEC managing module 1005 of the control platform 100 would instruct the processor 1001, so as allowing the processor 1001 to, according the request message of the UE_1, select at least one relay gateway GW_i of the relay gateways GW_1~GW_10 in the D2D relay network 10 to be a mobile-edge cloudlet CL_1 for the UE_1.

The relay gateways GW_3, GW_6 and GW_8 being selected to be the mobile-edge cloudlet CL_1 for the UE_1 is taken as an example for the following descriptions; however it should not limit the scope of the present disclosure. Furthermore, the following descriptions are based under the premise that relay gateways GW_3, GW_6 and GW_8 are assigned to perform the application service program with different loading proportions.

When the MEC managing module 1005 instructs the processor 1001 to determine the application service program not existing in each of the relay gateways GW_3, GW_6 and GW_8, the dynamic loading module 1007 would be configured to instruct the processor 1001 to load the application service program into each of the relay gateways GW_3, GW_6 and GW_8. The MEC managing module 1005 would then instruct the processor 1001, so as allowing the processor 1001 to notify the UE_1 with the host location of at least one of the relay gateways GW_3, GW_6 and GW_8.

Since the relay gateway GW_3 in the mobile-edge cloudlet CL_1 is the closest to the UE_1, the host location of the relay gateway GW_3 being selected and send to the UE_1 for notification is taken for the example. It should be noted that the above description is only for example, and thus should not limit the scope of the present disclosure.

The UE_1 would next, according to the received host location of the relay gateway GW_3, re-transmit the request message to the relay gateway GW_3 to request the execution of the application service program. Hence, the relay gateways GW_3, GW_6 and GW_8 in the mobile-edge cloudlet CL_1 would, based on the assigned loading proportions, perform the application service program.

It should be noted that in the embodiment shown in FIG. 7, the relay gateway GW_3 performing the application service program is taken as an example for the sake of convenience. After the application service program is performed by the relay gateways GW_3, GW_6 and GW_8, a corresponding response with respect to the application service program would be sent back to the UE_1 via the relay gateway GW_3 in the mobile-edge cloudlet CL_1.

In sum, according to the MEC control method, network system and control platform as provided in the embodiments of the present disclosure, a UE can receive the corresponding response with respect to the application service program without the need of a CN to access to the Internet, which allows a low latency on the services, and alleviates the loading pressure on the CN.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A control method for mobile-edge computing (MEC), being operated in a network system, wherein the network system includes a device-to-device (D2D) relay network, at least one user equipment (UE) and a control platform, the control method comprising:

instructing the control platform to receive a request message from the UE, wherein the request message is used to request an execution of an application service program; and according to the request message of the UE, the control platform selecting at least one of relay gateways in the D2D relay network as a mobile-edge cloudlet for the UE, and performing the application service program through the mobile-edge cloudlet, wherein the step of the control platform selecting at least one of relay gateways in the D2D relay network as a mobile-edge cloudlet of the UE, and performing the application service program through the mobile-edge cloudlet includes:
determining whether the application service program exists in the D2D relay network;
when the application service program is determined to be in the D2D relay network, the control platform, according to a service capability of each of the relay gateways in the D2D relay network, selects the at least one relay gateway as the mobile-edge cloudlet for the UE;
instructing the control platform to determine whether the application service program exists in the mobile-edge cloudlet;
when the application service program is determined as being in the mobile-edge cloudlet, the control platform notifies the UE of a host location of the at least one relay gateway in the mobile-edge cloudlet, and
when the application service program is determined to be not existing in the mobile-edge cloudlet, the control platform loads the application service program into the mobile-edge cloudlet, and controls the mobile-edge cloudlet to perform the application service program.

2. The control method according to claim 1, further comprising:
instructing the relay gateways in D2D relay network to respectively transmit a discovery message, and instructing the UE to report a location message to the control platform when the UE receives one of the discovery messages of the relay gateways.

3. The control method according to claim 1, wherein when the application service program is determined as not existing in the D2D relay network, the control platform controls the at least one relay gateway in the D2D relay network to, through a core network, access the application service program.

4. The control method according to claim 1, wherein the service capability of each of the relay gateways in the D2D relay network is a central processing unit (CPU) remaining usage rate of each of the relay gateways, a bandwidth remaining usage rate of each of the relay gateways or a node distance value between the UE and each of the relay gateways.

5. The control method according to claim 4, wherein the control platform establishes a weight equation according to the CPU remaining usage rate, the bandwidth remaining usage rate and the node distance value, calculates a capability estimation value of each of the relay gateways in the D2D relay network according to the weight equation, and selects the at least one relay gateway as the mobile-edge cloudlet for the UE according to the capability estimation value of each of the relay gateways in the D2D relay network.

6. The control method according to claim 5, wherein the weight equation is expressed as $A*Wa+B*Wb+C*Wc=W$, wherein W is the capability estimation value of each of the relay gateways in the D2D relay network, A is the CPU remaining usage rate of each of the relay gateways, B is the bandwidth remaining usage rate of each of the relay gateways and C is the node distance value between the UE and each of the relay gateways, wherein Wa, Wb and Wc are respectively a CPU remaining usage rate weight, a bandwidth remaining usage rate weight and a node distance value weight.

7. The control method according to claim 5, wherein when the at least one relay gateway as the mobile-edge cloudlet includes more than two, the control platform, according to the capability estimation value of each of the relay gateways in the mobile-edge cloudlet, assigns each of the relay gateways in the mobile-edge cloudlet to perform the application service program with different loading proportions.

8. The control method according to claim 1, wherein when the application service program is determined as not existing in the mobile-edge cloudlet, the control platform loads the application service program into the at least one relay gateway in the mobile-edge cloudlet.

9. A network system for mobile-edge computing (MEC), comprising:
a device-to-device (D2D) relay network;
at least one user equipment (UE); and
a control platform, receiving a request message from the UE;
wherein the request message is used to request an execution of an application service program;
wherein the control platform, according to the request message of the UE, selects at least one of relay gateways in the D2D relay network as a mobile-edge cloudlet for the UE, and performs the application service program through the mobile-edge cloudlet; and
wherein the control platform selecting at least one of relay gateways in the D2D relay network as a mobile-edge cloudlet of the UE, and performing the application service program through the mobile-edge cloudlet further includes:
determining whether the application service program exists in the D2D relay network;
when the application service program is determined to be in the D2D relay network, the control platform, according to a service capability of each of the relay gateways in the D2D relay network, selects the at least one relay gateway as the mobile-edge cloudlet for the UE;
determining whether the application service program exists in the mobile-edge cloudlet by the control platform;
when the application service program is determined as being in the mobile-edge cloudlet, the control platform notifies the UE of a host location of the at least one relay gateway in the mobile-edge cloudlet; and
when the application service program is determined to be not existing in the mobile-edge cloudlet, the control platform loads the application service program into the mobile-edge cloudlet, and controls the mobile-edge cloudlet to perform the application service program.

10. The network system according to claim 9, wherein the service capability of each of the relay gateways in the D2D relay network is a central processing unit (CPU) remaining usage rate of each of the relay gateways, a bandwidth remaining usage rate of each of the relay gateways or a node distance value between the UE and each of the relay gateways.

11. A control platform for mobile-edge computing (MEC), comprising:
a processor; and
a storage circuit, configured to include a message processing module and an MEC managing module;
wherein the message processing module is configured to instruct the processor to receive a request message from a user equipment (UE);

wherein the MEC managing module is configured to instruct the processor to, according to the request message of the UE, select at least one of relay gateways in a device-to-device (D2D) relay network as a mobile-edge cloudlet for the UE, and to perform an application service program through the mobile-edge cloudlet;

wherein the processor selecting, according to the request message of the UE, at least one of the relay gateways in the D2D relay network as the mobile-edge cloudlet for the UE further includes:

determining whether the application service program exists in the D2D relay network;

when the application service program is determined to be in the D2D relay network, instructing, by the MEC managing module, the processor to, according to a service capability of each of the relay gateways in the D2D relay network, select the at least one relay gateway as the mobile-edge cloudlet for the UE;

instructing, by the MEC managing module, the processor to determine whether the application service program exists in the mobile-edge cloudlet;

when the application service program is determined to be in the mobile-edge cloudlet, notifying, by the control platform, the UE of a host location of the at least one relay gateway in the mobile-edge cloudlet; and when the application service program is determined to be not existing in the mobile-edge cloudlet, loading, by the control platform, the application service program into the mobile-edge cloudlet, and controlling the mobile-edge cloudlet to perform the application service program.

12. The control platform according to claim 11, wherein when the application service program is determined as not existing in the D2D relay network, the MEC managing module instructs the processor to control the at least one relay gateway in the D2D relay network to, through a core network.

13. The control platform according to claim 11, wherein the service capability of each of the relay gateways in the D2D relay network is a central processing unit (CPU) remaining usage rate of each of the relay gateways, a bandwidth remaining usage rate of each of the relay gateways or a node distance value between the UE and each of the relay gateways.

14. The control platform according to claim 11, wherein the storage circuit is configured to include a dynamic loading module, and when the application service program is determined as not existing in the mobile-edge cloudlet, the dynamic loading module is configured to instruct the processor to load the application service program into the at least one relay gateway in the mobile-edge cloudlet.

* * * * *